US 10,099,789 B2

(12) United States Patent
Becker et al.

(10) Patent No.: US 10,099,789 B2
(45) Date of Patent: Oct. 16, 2018

(54) SELF SUFFICIENT GALLEY SYSTEM, METHOD FOR OPERATING ELECTRICAL GALLEY DEVICES, AND AIRCRAFT HAVING SUCH A GALLEY SYSTEM

(71) Applicant: Airbus Operations GmbH, Hamburg (DE)

(72) Inventors: Lars-Ole Becker, Hamburg (DE); Matthias Reiss, Hamburg (DE); Yener Palit, Hamburg (DE); Thorsten Otto, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 273 days.

(21) Appl. No.: 14/966,776

(22) Filed: Dec. 11, 2015

(65) Prior Publication Data
US 2016/0176526 A1 Jun. 23, 2016

(30) Foreign Application Priority Data

Dec. 23, 2014 (EP) .................................... 14200084

(51) Int. Cl.
B64D 11/04 (2006.01)
B64D 41/00 (2006.01)
(Continued)

(52) U.S. Cl.
CPC .............. B64D 11/04 (2013.01); B64D 41/00 (2013.01); H02J 3/387 (2013.01); H02M 3/04 (2013.01);
(Continued)

(58) Field of Classification Search
None
See application file for complete search history.

(56) References Cited

U.S. PATENT DOCUMENTS 5,637,933 A 6/1997 Rawlings et al.
2004/0057177 A1 3/2004 Glahn et al.
(Continued)

FOREIGN PATENT DOCUMENTS

DE 102007054429 A1 5/2009
EP 2213571 A2 8/2010
(Continued)

OTHER PUBLICATIONS

European Patent Office, European Search Report for European Patent Application No. 14200084.3 dated Jun. 8, 2015.

Primary Examiner — Jared Fureman
Assistant Examiner — Aqeel Bukhari
(74) Attorney, Agent, or Firm — Lorenz & Kopf, LLP

(57) ABSTRACT

A galley system comprising at least one electrically operated galley device, a galley frame having at least one compartment for housing the at least one galley device, at least one fuel cell unit, and a power control and monitoring unit coupled with the at least one galley device and the at least one fuel cell unit. The power control and monitoring unit is adapted for receiving a power request signal from the at least one galley device, for determining, whether the at least one fuel cell unit is able to provide the requested power and for sending an acknowledgment signal to the respective galley device, when the at least one fuel cell unit is able to provide the requested power, and wherein the galley system is independent from an external power supply.

10 Claims, 2 Drawing Sheets

(51) Int. Cl.
*H02M 3/04* (2006.01)
*H02M 7/06* (2006.01)
*H02M 7/44* (2006.01)
*H02J 3/38* (2006.01)

(52) U.S. Cl.
CPC ............... *H02M 7/06* (2013.01); *H02M 7/44* (2013.01); *B64D 2041/005* (2013.01); *Y02T 50/44* (2013.01); *Y02T 50/46* (2013.01); *Y02T 90/36* (2013.01)

(56) References Cited

U.S. PATENT DOCUMENTS

| | | | |
|---|---|---|---|
| 2005/0121978 A1 | 6/2005 | McAvoy | |
| 2010/0233552 A1* | 9/2010 | Knepple | B64D 11/04 429/420 |
| 2014/0263834 A1 | 9/2014 | Goodman | |
| 2014/0263835 A1 | 9/2014 | Godecker et al. | |
| 2015/0028670 A1* | 1/2015 | Boodaghians | B64D 11/04 307/9.1 |
| 2015/0076900 A1* | 3/2015 | Johannsen | H02J 4/00 307/9.1 |
| 2015/0364780 A1* | 12/2015 | Libis | H01M 8/04955 429/418 |

FOREIGN PATENT DOCUMENTS

| | | | |
|---|---|---|---|
| WO | 2009062597 A2 | 5/2009 | |
| WO | 2013136286 A2 | 3/2012 | |

* cited by examiner

SELF SUFFICIENT GALLEY SYSTEM, METHOD FOR OPERATING ELECTRICAL GALLEY DEVICES, AND AIRCRAFT HAVING SUCH A GALLEY SYSTEM

CROSS-REFERENCE TO RELATED APPLICATIONS

This application claims priority to Application No. 14 200 084.3, filed 23 Dec. 2014, which is incorporated herein by reference in its entirety.

TECHNICAL FIELD

This relates to a galley system, a method for operating electrical galley devices and an aircraft having such a galley system.

BACKGROUND

Common catering facilities on both private and commercial aircraft include one or more galleys that are equipped with stand-alone galley utensils, which are often referred to as electrical galley insert equipment (also referred to as "GAIN"). These include, but are not limited to, functionalities of ovens, chillers/freezers, beverage makers, and trash compactors. For their operation, the equipment is provided with electrical power of 115/200 V AC through an aircraft power supply. In order to comply with stringent requirements of the aircraft power supply, extensive development of complex electronics and high qualification testing efforts are required. Depending on the installed equipment, the required electrical power is relatively large, leading to cables with a respective sufficient diameters.

Many of the electrical sub-components within the GAIN are operating on direct current, which is converted within each unit via an integrated AC/DC converter from the alternating current that is provided from the aircraft power supply system.

Equipment units, which require water supply, such as steam ovens, beverage makers, water heaters, etc., are provided with water from the aircraft potable water system or, in few cases, may comprise manually filled internal tanks.

SUMMARY

It is an object to propose a galley system that requires a reduced effort for meeting certification requirements in a vehicle as well as reduced cable lengths and diameters, while maintaining a flexibility for using different galley insert devices.

A galley system is proposed, comprising at least one electrically operated galley device, a galley frame having at least one compartment for housing the at least one galley device, at least one fuel cell unit, and a power control and monitoring unit coupled with the at least one galley device and the at least one fuel cell unit. The power control and monitoring unit is adapted for receiving a power request signal from the at least one galley device, for determining whether the at least one fuel cell unit is able to provide the requested power and for sending an acknowledgement signal to the respective galley device, when the at least one fuel cell unit is able to provide the requested power. Furthermore, the galley system is independent from an external power supply.

Electrically operated galley devices are consumers of electrical energy, such as electrical galley inserts (GAIN), which are mentioned above. Commonly, these galley devices consume a large fraction of available electrical power provided through an electrical network, which are usually fed by engine operated generators. A galley device is inserted into an associated compartment of the galley.

The galley frame provides the general shape of the galley and may be designed based on common design principles for monuments in aircraft. The at least one compartment allows to insert a galley device and may provide electrical connectors and, if desired, an air extraction port couplable with an air extraction means of the galley system or any other connector.

The fuel cell unit may comprise at least one fuel cell, e.g. a single fuel cell, a fuel cell stack or a plurality of fuel cell stacks, wherein the at least one fuel cell is able for conducting a fuel cell process under consumption of hydrogen and air for generating electric power, oxygen depleted air and water. Also, instead of air another oxygen containing gas or pure oxygen may be used, wherein in the latter case the generation of oxygen depleted air is not possible. The fuel cell itself may be of any suitable type, which may include a low temperature, a medium temperature or a high temperature fuel cell type that produces electricity and heat. For the use in vehicles, the fuel cell may preferably, but not limited to, include proton exchange membrane fuel cells, also known as polymer electrolyte membrane fuel cells (PEMFC).

Hence, the at least one electrically operated galley device is powered by the at least one fuel cell unit, such that an external power supply is not necessary for the galley system. Long cables having relatively large diameters for transferring power from a central power source in the vehicle to the galley devices are not necessary. However, for minimizing the maximum design power of the at least one fuel cell unit, a power control and monitoring unit monitors and controls the power delivery to the individual galley devices.

Depending on a power request indicated through a power request signal transferred from the at least one galley device to the power control and monitoring unit, the latter is able to decide, whether a certain galley device may be operated through assigning a fraction of available power or not. This contributes to a higher flexibility in terms of number and type of installed galley devices.

Due to the fact, that all galley devices are usually not operated simultaneously, an electrical over-installation is possible, i.e. with the sum of the maximum required power of all galley devices is larger than the design power of the fuel cell unit, while cable diameters in the galley system may be minimized and the cable lengths are highly reduced, as the fuel cell unit is very close to all galley devices.

However, it is necessary that each galley insert sends a power request to the power control and monitoring unit to request or "book" a certain amount of available power. The power control and monitoring unit may then assign a fraction of the available power budget to the respective galley device. If such a fraction of power budget is available, the galley insert will receive a confirmation through an acknowledgment signal from the power control and monitoring unit, that it may initiate the operation. However, if the required power is not available for the respective galley device, it may wait for a respective signal and pause the initiation of its operation until sufficient power is available. The respective galley insert may repeat to send a request signal periodically in case an acknowledgment signal has not yet been received.

Each of the installed galley devices should comprise a dedicated control unit, which may only consume very little electrical power from the at least one fuel cell unit. This allows to communicate with the power control and monitoring unit for sending power supply requests.

The galley system according to the embodiment is autarkic, i.e. self-sufficient, for mobile vehicles such as but not limited to aircraft. The at least one fuel cell unit allows the direct usage of the output power of the fuel cell unit, which is a DC voltage, within the electrical galley insert equipment and other power consumers such as lights. Due to the fact that most electrical components within the galley insert equipment, such as compressors, fans, monitoring devices, etc., are already DC driven, no AC/DC converters are necessary anymore. Currently, such converters are integrated in each galley insert equipment separately. As a result, only a DC/DC conversion needs to be integrated either in the respective galley inserts or centrally in the galley system, depending on the power needs of the respective electrical components. The removal of an AC/DC converter has the benefit of reduced equipment weight and a positive impact on the reliability of the galley system.

Altogether, this allows the galley system to be completely independent from any external power supply, which directly leads to a heavy reduction of installed cables in the vehicle, converters for electrical energy and therefore total weight. Still, the galley system allows a very flexible operation of all galley devices. The galley system according to the embodiment allows simply and decentrally to provide electrical power to the galley devices and, at the same time, allows a flexible integration of different galley devices.

In an advantageous embodiment, the power control and monitoring unit is adapted for prioritization of a power provision to different kinds of galley devices, such that the power supply to a first group of galley devices comprises a higher priority than the power supply to a second group of galley devices. Resultantly, depending on an assigned priority, a limited power budget is shared particularly among galley devices having the highest priority, before galley devices with a lower priority are provided with power. Power is only delivered when required. Hence, galley devices being switched on by cabin personnel, may be operated when power is available. This may happen at once or at a later stage when the power budget allows the operation of the respective galley device besides others.

In a preferred embodiment, the first group of galley devices comprises cooling devices. In galleys often heat producing devices or cooling devices are installed. For example, cooling devices for food may continuously be operated during the operation of the vehicle, thereby preventing the food to reach a temperature above a predetermined maximum temperature, thus ensuring the cold chain. Also, other cooling devices prevent heat producing devices to overheat, such as the at least one fuel cell unit itself. A cooling system for the at least one fuel cell unit comprises the highest priority, wherein the required power for the cooling system may rise with increasing supply of power.

The power control and monitoring unit may further be adapted for receiving an override signal and for interrupting, reducing and/or re-organizing the provision of power to the at least one galley device. This may for example be initiated by an operator, who would prefer one galley device over the other, or by an external device. For example, this may be a safety driven event.

Still further, the fuel cell unit may comprise a deactivation override switch, which may be used in an emergency, wherein the deactivation override switch may comprise a process for safely shutting down the fuel cell unit.

In another advantageous embodiment, the power control and monitoring unit comprises a first communication device, wherein the at least one galley device comprises a second communication device, which first and second communication device are couplable through a network structure. Through the first and second communication devices, the galley devices as well as the power control and monitoring unit are able to communicate with other devices, such as for transferring power request signals, acknowledgment signals, user queries or status signals. The use of a wired network structure may allow a very robust communication, while using wireless network structures it must be ensured that the respective carrier frequencies are chosen such that other wireless communication in the vehicle is not disturbed. Also, the intensity of the wireless signal should be chosen in a way that a reliable communication is allowed, which is not hindered or obstructed by prominent metallic structures in the transfer direction.

In a preferred embodiment, the network structure is realized as a power line communication (also referred to as "PLC") structure. As the at least one fuel cell unit offers itself for the integration of a DC network in the galley system, the PLC network would be integrated into the DC network. The PLC technology operates through adding modulated carrier signals to an existing wiring system. Especially when using a DC network, there is no impact on AC power and an AC data network. Moreover, data communication is easier in DC networks, if cable lengths are relatively short, which is the fact due to a decentralized electrical circuit. Such a communication structure of the galley system according to the embodiment is limited to the self-sufficient and independent galley system and therefore only significantly less stringent data and electrical requirements than for central vehicle circuits have to be considered.

In another advantageous embodiment, which may be used as an alternative or as an addition, at least one wireless communication device is present. This may especially provide a connection to the power control and monitoring unit and allows to connect a portable electronic device to the galley system for monitoring and control purposes.

Basically, using a network communication structure, a module-wise data exchange between various power consumers, such as galley devices, is possible, which not only includes data or signals for supporting a power management function, but also health monitoring functions and the ability to provide a communication interface to a fixed or portable galley indication/control panel for monitoring and control purposes. Through the indication/control panel, all major status information and necessary controls should be accessible. This may include the charging level of an internal fuel storage as well as the status information of every (at least major) power consumer.

The network structure may be adapted for an internal communication, i.e. only within the boundary of the galley system, and for an external communication, i.e. with devices outside the galley system. In order to ensure communication to another system of the vehicle, such as an on board maintenance system, a cabin intercommunication data structure, integrated modular avionics or an electric power distribution network, or other modules, an external communication interface is integrated into the galley system. This may be one of a wireless network structure or a wired network structure, such as a CAN bus or AFDX. For this purpose, any data that originates from a device inside the galley system, which are intended to be sent to an external system of the vehicle, may be formatted in a suitable data converter.

Still further, the power control and monitoring unit may be adapted for receiving an emergency signal from an external source and for reducing the supplied power to the galley devices and to provide electrical power to the emergency network and wherein the fuel cell unit is couplable with an external electrical network. In case an emergency situation occurs in the vehicle, the fuel cell unit of the galley system may supply electrical power to an emergency network, while galley devices of the associated galley system may be switched off or may be brought into an operating state with reduced function. However, several different possible scenarios may exist. The galleys system may simply provide electrical power to installations in the cabin of the vehicle, which provide guidance for passengers, such as acoustic or optical warnings, signs or lights. The galley system may also provide electrical power to a main emergency network, which supplies different more critical electrical consumers. Especially in case several self-sufficient galley systems are installed in the cabin of the vehicle, a separate emergency power supply unit may either be eliminated or its redundancy may be increased.

Preferably, the at least one galley device comprises a DC consumer, which allows the electrical network inside the galley system to be a DC network. However, in case different galley devices require different voltages, DC/DC converters may be implemented, either in the galley devices itself or in a central unit. For example, a central DC/DC converter may provide one, two, three or more different DC voltages, which allow to operate a number of different DC consumers.

Further, in case the at least one galley device comprises an AC consumer, DC/AC converters may be installed particularly directly at the respective galley device or in a central unit. If desired, in order to provide power to other electrical consumers in the cabin, which necessarily need AC power for operation, the galley system may comprise a DC/AC converter that includes a connection to a non-essential and/or an essential power network in the vehicle.

In a still further advantageous embodiment, the at least one fuel cell unit is coupled with a cooling circuit, which comprises a first heat exchanger thermally coupled with the at least one fuel cell unit and a second heat exchanger, which is immersed in a water tank, wherein the cooling circuit is adapted for at least selectively conveying a coolant through the first heat exchanger and the second heat exchanger in order to heat water in the water tank. Fuel cell waste heat is thereby delivered to water, thereby leading to heating of a certain amount of water during operation of the fuel cell unit, which in turn leads to a reduced power requirement for water heaters and the such. Depending on the size of the water tank, a distinct amount of heat may be removable from the at least one fuel cell unit.

Still further, the cooling circuit may comprise a through-flow heater, which is flown through by water that is to be heated. The through-flow heater may comprise an electrical heater, wherein the through-flow heater is coupled with the at least one fuel cell unit.

Any of the second heat exchanger and the through-flow heater may be used to periodically disinfect the water in the water tank thermally, when excess electrical power is available or when excess waste heat is available.

Galley devices, which produce odours, heat and/or water vapour, may be placed in compartments that are able to conduct an air extraction through a suction port arranged in the respective compartment. An air extraction means may be coupled with the suction port and may be realized through any means that is capable of sucking of or conveying air from the galley to another compartment, interior space or the surrounding of the aircraft. The air extraction means may comprise an active air conveying means, such as a fan or a blower, or a passive air conveying means, such as a device that is based on the Venturi principle.

For removing heat from the at least one fuel cell unit it may also be feasible to use an air cooled fuel cell, which comprises means for transferring thermal energy from inside the respective fuel cell to a surrounding airflow, which may be induced by a separate air conveying means or an air extraction means through an above mentioned air extraction port. The heat transfer may be accomplished through any heat dissipating means imaginable, such as heat transfer fins, through-flow openings, conduits and/or in general an open cathode fuel cell design. The air may flow through said fuel cell and/or around a housing of said fuel cell, which may also be heat dissipating.

Generated water and oxygen depleted air, which arise during the operation of the at least one fuel cell unit, may further be used inside the vehicle, such as for flushing water in a washroom assembly or as inert gas for fire protection or extinction.

The embodiment also relates to a method for operating at least one galley device in a galley system, comprising the steps of operating at least one fuel cell unit in a galley system, sending a power supply request signal from an electrically operated galley device to a power control and monitoring unit, receiving the power supply request signal from the at least one galley device, determining, whether the at least one fuel cell unit is able to provide the requested power and for sending an acknowledgment signal to the respective galley device, when the at least one fuel cell unit is able to provide the requested power, and operating the galley device under consumption of power of the at least one fuel cell unit.

The method also comprises the step of prioritizing the electrical supply between a first group of galley devices and a second group of galley devices.

The embodiment further relates to a vehicle having a cabin and such a galley system. The vehicle may be of any vehicle type, such as a land craft, a water craft, an aircraft or the such. However, using the galley system according to the embodiment in a cabin of an aircraft, such as a commercial aircraft, leads to a clear reduction in cable lengths, cable diameters and weight, therefore leading to a reduced fuel consumption.

BRIEF DESCRIPTION OF THE DRAWINGS

The various embodiments will hereinafter be described in conjunction with the following drawing figures, wherein like numerals denote like elements, and.

Further characteristics, advantages and application options of the embodiments are disclosed in the following description of the exemplary embodiments in the figures. All the described and/or illustrated characteristics per se and in any combination form the subject of the embodiment, even irrespective of their composition in the individual claims or their interrelationships. Furthermore, identical or similar components in the figures have the same reference characters.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
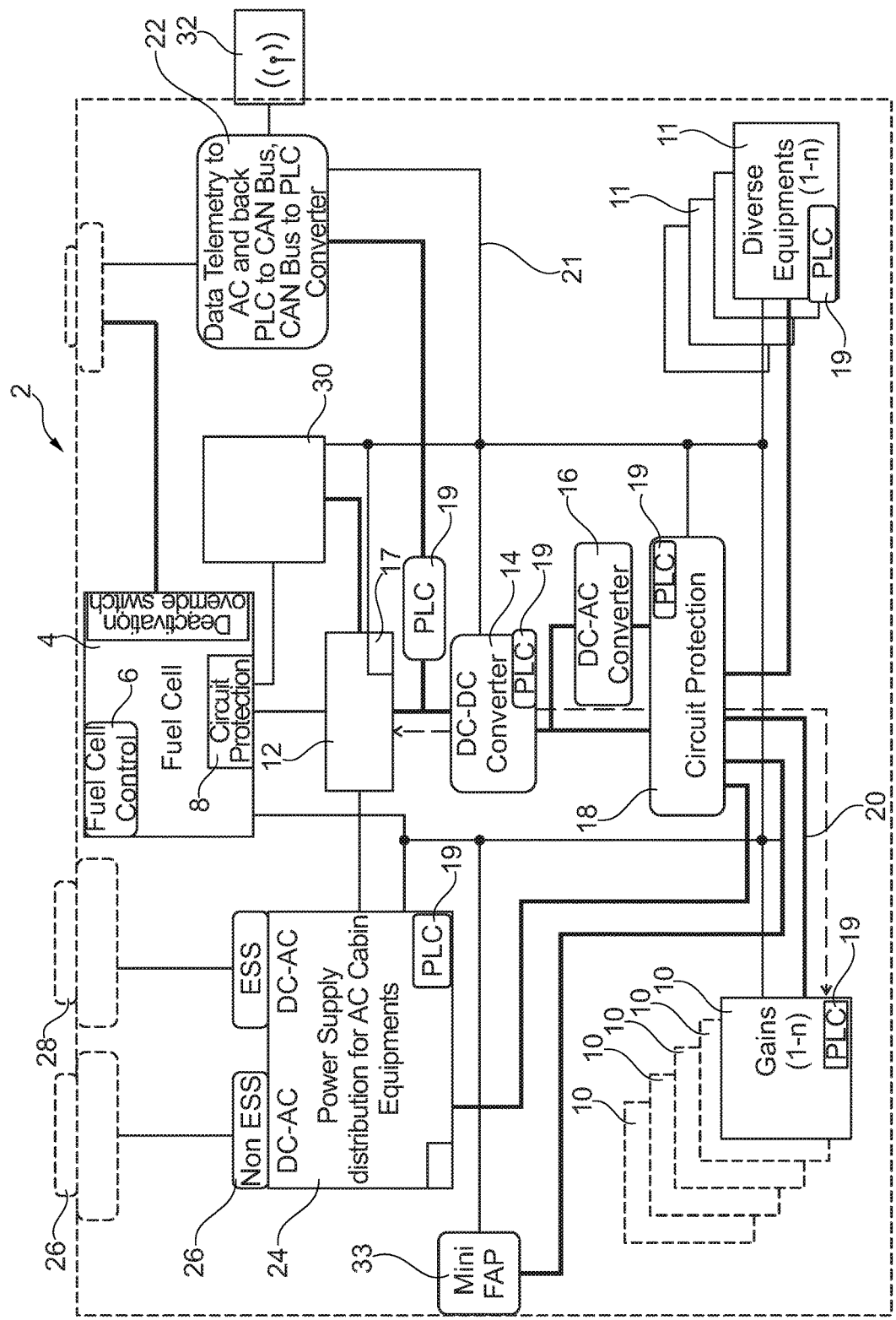
FIG. 1 shows a block-oriented, schematic view of a galley system according to an embodiment.

FIG. 1 shows a galley system 2, which is self-contained, independent and flexible. As a power source, a fuel cell unit 4 comprises at least one fuel cell, particularly a stack of fuel cells, which may be controlled by a dedicated fuel cell control unit 6 and comprising a circuit protection unit 8 for preventing a damage to the fuel cell unit 4.

The fuel cells that may be installed in such a fuel cell unit 4 may especially be PEM fuel cells that comprise operating temperatures in a range between 60° C. and 90° C. The fuel cell unit 4 may be supplied with hydrogen through an internal hydrogen tank, which is not depicted herein, as well as with oxygen, either by providing pure oxygen or, which would not require a dedicated oxygen tank, by providing air. Air may be fed to the fuel cell unit 4 through an air extraction means usually provided for galleys in order to reduce odours and vapour. However, a dedicated air supply may also be possible. Oxygen depleted air, which arises during operation of the fuel cell unit 4 when air is fed to the fuel cell unit 4, may be disposed of through said air extraction means or through a dedicated waste gas removal system, which is not depicted herein.

In the galley system 2, a number of electrically operated galley devices 10 are present, which are coupled with the fuel cell unit 4 managed by a power control and monitoring unit 12. Depending on the technology of the respective galley devices 10, it may be necessary to convert the voltage delivered by the fuel cell unit to another DC voltage through a DC-DC-converter 14 or into an AC voltage through a DC-AC-converter 16. However it is preferred to install DC voltage consuming devices into the galley system 2 to reduce the use of DC-AC converters as much as possible.

It is advantageous to use the DC-DC-converter 14 and the DC-AC-converter 16 to supply a circuit protection unit 18 as a distribution unit with the DC voltage and the AC voltage, respectively, to which the galley devices 10 and other diverse equipment 11 are connected.

A possible approach for designing the power supply of the fuel cell unit 4 is to add the maximum required power of all galley devices 10. However, this would lead to an unduly large fuel cell unit 4, which would hardly ever deliver the maximum design power. According to an embodiment, the power control and monitoring unit 12 is able to communicate with the galley devices 10, which is indicated by dashed lines representing signal communication, i.e. a network structure 13, between the galley devices 10, diverse equipment 11, and the power control and monitoring unit 12.

Depending on the actual layout of the galley system 2 as well as of required galley devices 10 and diverse equipment 11, it is feasible to provide at least two different fuel cell units 4 having different design powers, such that an operator of the vehicle may choose a feasible size of the fuel cell unit 4 for meeting the operator's demand.

However, the power control and monitoring unit 12 is adapted for storing the information of a maximum power that the fuel cell unit 4 is able to deliver. Through communicating particularly with the individual galley devices 10, the power control and monitoring unit 12 may assign fractions of the available power to the different galley devices 10. Resultantly, when switching on a certain galley device 10, the respective galley device 10 sends a request to the power control and monitoring unit 12 and waits for receiving an acknowledgement signal from the power control and monitoring unit 12, such that the operation may be initiated.

On the other hand, the power control and monitoring unit 12 may always during operation of the vehicle listen for power request signals. In order to facilitate the decision made by the power control and monitoring unit 12, the power request signals may also include information of the type of galley device 10 and/or a certain value of maximum or average power that is expected to be delivered. Depending on the requested power as well as depending on the type of galley device 10, the power control and monitoring unit 12 decides whether a certain galley device 10 may be operated or not.

Further, the power control and monitoring unit 12 may comprise a set of data representing different priorities for different groups of galley devices 10 and diverse equipment 11, leading to the ability of prioritization among the different galley devices 10 and diverse equipment 11. For example, cooling devices for cooling food as well as for disposal of fuel cell waste heat should have the highest priority.

The power control and monitoring unit 12 may comprise a first communication device 17, while the other installations may comprise a second communication device 19. These are named first and second communication devices just for their differentiation, while the communication devices may be exactly the same. Preferably, the communication between the galley devices 10 and the power control and monitoring unit 12 may be conducted through a power line communication directly over respective power lines 20, which are placed between the galley devices 10, diverse equipment 11, the circuit protection unit 18, the DC-DC-converter 14, the power control and monitoring unit 12, etc. As a fuel cell driven electrical network may comprise a DC voltage, carrier frequencies are basically unlimited and any influences between an AC voltage and the data communication can be neglected.

Another important feature of the galley system 2 is the fact that a communication with the vehicle, i.e. higher level systems inside the vehicle, or other external devices may be provided through a telemetry unit 22, which may be equipped with a network converter for converting a power line communication structure into a CAN bus structure or any other data network structure and vice versa. Hence, an onboard maintenance system, a cabin intercommunication data system, an integrated modular avionics, an electrical power distribution center or any other system may be able to monitor, control, support or inhibit the operation of the galley system 2 depending on external conditions. For example, in case an emergency situation occurs, it may be feasible to inhibit or drastically reduce the supply of energy to the galley devices 10. Instead, the galley devices 10 may be set into an emergency mode having a minimized or no power consumption, such that the fuel cell unit 4 is able to deliver power to an external emergency network. This may exemplary include provision of power to emergency equipment such as emergency light, acoustic signals/announcements, etc. for a part or the complete cabin of the vehicle.

For relieving a central electrical network in the vehicle, the power control and monitoring unit 12 may also be coupled with a power supply distribution unit 24, which may be coupled with a non-essential AC bus 26 and an essential bus 28 of the vehicle. In case excess power is available from the fuel cell unit 4, it may be delivered to various installations in the cabin or the vehicle in general.

Besides controlling and monitoring the distribution of power inside the galley system 2 and the vehicle, a power storage unit 30, e.g. a battery or, for short time intervals, a capacitor, may be present, which may store electrical energy, leading to the ability to compensate electric load peak demands.

Additionally, a wireless communication device 32 is present, which may be coupled to the telemetry unit 22 and which allows to communicate with portable electronic devices that allow to interact especially with the power control and monitoring unit 12. For example, cabin personnel may have access to portable electronic devices that may connect to the power control and monitoring unit 12 through the wireless communication device 32.

At a housing or a frame of the galley system 2, a panel 33 may be arranged, which communicates with the power control and monitoring unit 12 through a PLC connection. In an aircraft, this may be similar to a flight attendant panel (FAP), that may be somewhat reduced in size.

For increasing the redundancy, an additional wired network structure 21 is present as a fallback solution.

Figure 2:
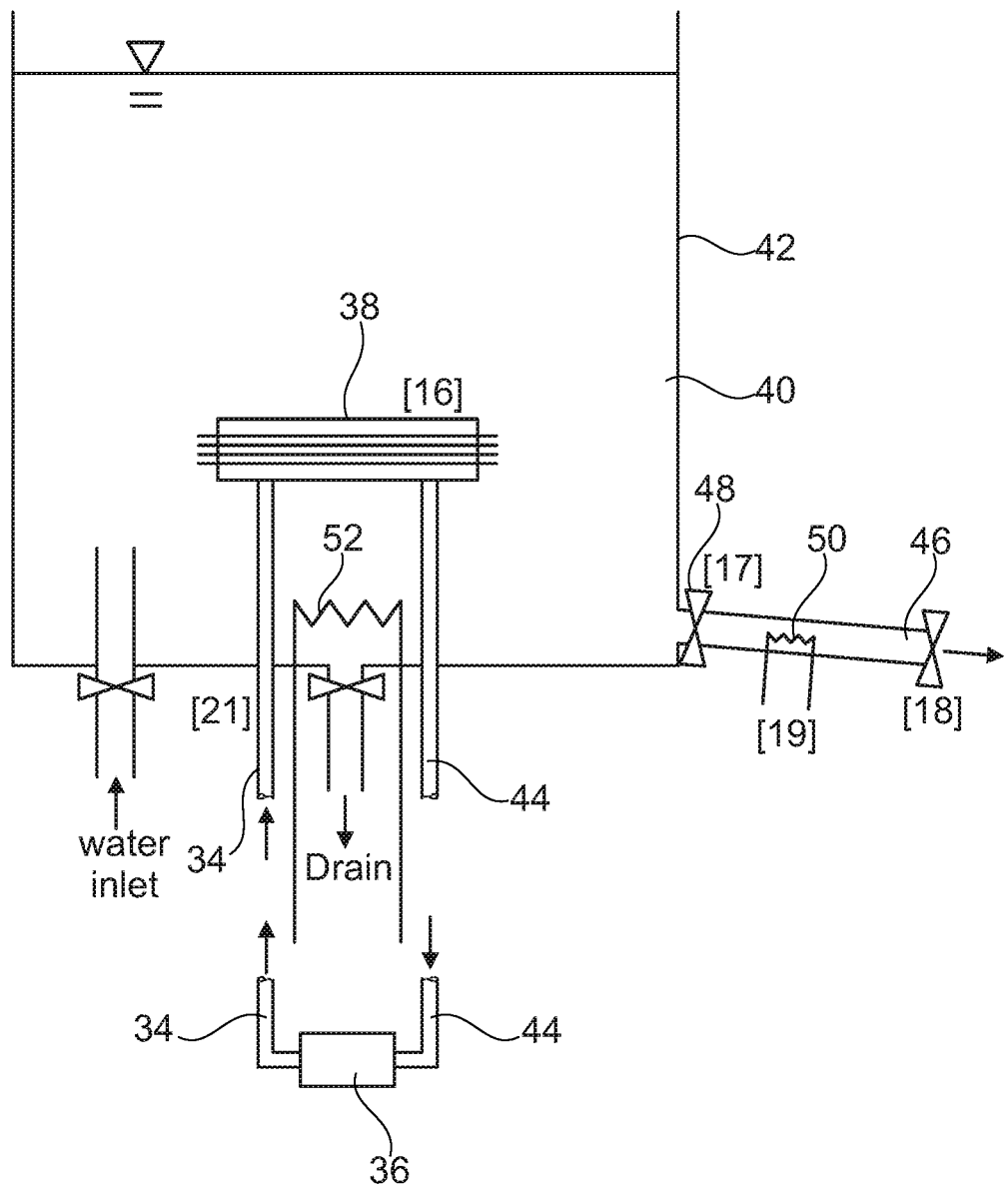
FIG. 2 shows a part of a cooling system coupled with a water heater.

In FIG. 2, a part of a cooling system for the fuel cell unit 4 is shown. Here, a feed line 34, which carries a coolant, extends from a first heat exchanger 36, which is in thermal contact with the fuel cells installed in the fuel cell unit 4, to a second heat exchanger 38, which is immersed in water 40 of a water tank 42. After flowing through the second heat exchanger 38, coolant flows through a return line 44 back to the first heat exchanger 36. Resultantly, the water 40 in the water tank 42 is a heat sink and, resultantly, is constantly preheated.

The water tank 42 may be separated to an outflow faucet 46 by means of a valve 48. Between the valve 48 and the faucet 46, an electrical flow-through heater 50 may be present, which heats water from the (preheated) present water temperature to a target temperature. Depending on the size of the water tank 42, the required power for the flow-through heater 50 may be drastically reduced and the generation of a bacteria population may be prevented.

However, a risk for bacteria growth in the water tank 42 and adjacent potable water components may be increased, when the preheat temperature level does not reach a lethal level for all bacteria. In this case, an automatic disinfection functionality, based on a thermal process, may be integrated into the galley system. For this purpose, no additional chemical agents or operating steps are needed apart from an additional electrical heater 52, which allows to heat up the water 40 to a temperature level exceeding 70° C. for a required time. Such a thermal disinfection may also be performed when a remaining fuel cell power budget is sufficient to perform this task and does not reduce a power budget for other consumers. This time may be controlled by the power control and monitoring unit 12.

The main benefits of the galley system are the self-sufficiency and the possible use as an independent emergency supply source. Therefore an easy and quick exchange of the galley system as well as the galley devices integrated into the galley system is possible. Also the qualification effort regarding power quality within the self-sufficient power generation is reduced. The combination with a network structure, such as a power line communication on DC electrical power lines allow the elimination of other, more sophisticatedly vehicle-integrated and currently available communication bus for the galley system, which resultantly leads to a reduction of weight and installation effort. Particularly, the electrical consumers, i.e. galley devices and other consumers, may directly be provided with a DC current, which reduces the weight and costs of the galley devices, as basically no AC/DC converters are required any more for a majority of galley devices. As these components are also often a source for emission of disturbing electrical signals therefore less emission filters are necessary. Altogether, qualification costs, certification time and equipment weight will be significantly lower than usual. The consequence of shorter development lead time may result in quicker updates of the galley insert equipment to incorporate new innovative design features more often and flexible than common.

In addition it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A galley system, comprising:
   at least one electrically operated galley device,
   a galley frame having at least one compartment for housing the at least one galley device,
   at least one fuel cell unit, and
   a power control and monitoring unit coupled with the at least one galley device and the at least one fuel cell unit,
   wherein the power control and monitoring unit is adapted for receiving a power request signal from the at least one galley device, for determining whether the at least one fuel cell unit is able to provide the requested power and for sending an acknowledgment signal to the respective galley device, when the at least one fuel cell unit is able to provide the requested power,
   wherein the galley system is independent from an external power supply,
   wherein the power control and monitoring unit prioritizes provision of power to different galley devices such that power supplied to a first group of galley devices has a higher priority than power supplied to a second group of galley devices, and
   wherein the power control and monitoring unit receives an override signal and, in response to receiving the override signal, interrupts, reduces, and/or reorganizes provision of power to the at least one galley device.

2. The galley system of claim 1, wherein the first group of galley devices comprises cooling devices.

3. The galley system of claim 1, wherein the power control and monitoring unit comprises a first communication device, wherein the at least one galley device comprises a second communication device, which first and second communication devices are couplable through a network structure.

4. The galley system of claim 3, wherein the network structure comprises a power line communication structure.

5. The galley system of claim 1,
wherein the power control and monitoring unit is adapted for receiving an emergency signal from an external source, for reducing the supplied power to the galley devices and for providing electrical power to an emergency network,
wherein the fuel cell unit is couplable with the emergency network.

6. The galley system of claim 1, further comprising a DC voltage electrical network.

7. The galley system of claim 1, further comprising a water tank for storing water,
wherein the at least one fuel cell unit is coupled with a cooling circuit, which comprises a first heat exchanger thermally coupled with the at least one fuel cell unit and a second heat exchanger, which is immersed in the water tank,
wherein the cooling circuit is adapted for at least selectively conveying a coolant through the first heat exchanger and the second heat exchanger for heating water in the water tank.

8. The galley system of claim 7, further comprising an additional through-flow heater, which is flown through by water that is to be heated,
wherein the through-flow heater comprises an electrical heater, which is coupled with the at least one fuel cell unit.

9. The galley system of claim 7, wherein the galley system is adapted for conducting a thermal disinfection of the water in the water tank by increasing the temperature to a disinfection temperature for a predetermined time interval.

10. A method for operating at least one galley device in a galley system, comprising the steps of:
operating at least one fuel cell unit in a galley system,
sending a power supply request signal from an electrically operated galley device to a power control and monitoring unit,
receiving the power supply request signal from the at least one galley device by the power control and monitoring unit,
determining, whether the at least one fuel cell unit is able to provide the requested power,
sending an acknowledgment signal to the respective galley device, when the at least one fuel cell unit is able to provide the requested power,
operating the galley device under consumption of power of the at least one fuel cell unit,
prioritizing an electrical supply between a first group of galley devices and a second group of galley devices, and
interrupting, reducing, and/or reorganizing provision of power to the at least one galley device upon receiving an override signal.

* * * * *